United States Patent
Futatsugi et al.

[11] Patent Number: 5,566,336
[45] Date of Patent: Oct. 15, 1996

[54] OPERATION MACRO GENERATED METHOD THAT CHANGES EXECUTION CONTROL ACCORDING TO SYSTEM SITUATION

[75] Inventors: Seiji Futatsugi, Inagi; Yoshiki Matsuda, Kokubunji; Keiji Kojima, Sagamihara, all of Japan

[73] Assignee: Hitachi, Ltd., Tokyo, Japan

[21] Appl. No.: 214,404

[22] Filed: Mar. 16, 1994

[30] Foreign Application Priority Data

Mar. 22, 1993 [JP] Japan .................................. 5-061604

[51] Int. Cl.⁶ .................................................. G06F 9/44
[52] U.S. Cl. .................. 395/700; 364/286; 364/285; 364/940; 364/950; 364/976; 395/600
[58] Field of Search .................................. 395/700, 650, 395/600

[56] References Cited

U.S. PATENT DOCUMENTS

| | | | |
|---|---|---|---|
| 4,845,644 | 7/1989 | Anthias et al. | 364/521 |
| 4,896,290 | 1/1990 | Rhodes et al. | 364/900 |
| 5,086,386 | 2/1992 | Islam | 395/600 |
| 5,214,780 | 5/1993 | Ingoglia et al. | 395/600 |
| 5,448,739 | 9/1995 | Jacobson | 395/700 |

OTHER PUBLICATIONS

"Microsoft Excel Users Guide," 1989, pp. 450–458. (provided in Japanese) Considered to the Extent Explained in the Disclosure.

"CCT-98-III Simple Language Manual," developed by Gijyutsu Hyoron-Sha, 1991, pp. 22–35. (provided in Japanese) Considered to the Extent Explained in the Disclosure.

Primary Examiner—Kevin A. Kriess
Assistant Examiner—Lucien Toplu
Attorney, Agent, or Firm—Fay, Sharpe, Beall, Fagan, Minnich, & McKee

[57] ABSTRACT

A program generating method in which a program for performing again a series of user operations for an application program is generated as one which can be executed taking synchronization with a response message issued from a system program to the application program. A user operation for a window being used by an application is stored together with that window generation information issued for a request (for example, a request for window generation) from an application program which is issued from a window server to the requester application or a window manager. From the stored user operation is generated a command which transmits that operation to the application program. From the information from window server is generated a command which waits for that information.

6 Claims, 16 Drawing Sheets

FIG. 4A

204 WINDOW TABLE

| WINDOW # | PARENT WINDOW NAME | WINDOW NAME |
|---|---|---|
| 0 | - | Root |
| 1 | Root | Wm |
| 2 | Root | Wp |
| 3 | Wp | Print |
| 4 | Wp | Text |
| 5 | Root | Print? |
| 6 | Print? | Yes |
| 7 | Print? | No |
| 8 | Root | Paper? |
| 9 | Paper? | Cont. |
| 10 | Paper? | Cancel |

FIG. 4B

212 PORT VERSUS APPLICATION NAME CORRESPONDENCE TABLE

| RECEIVING PORT | SENDING PORT | APPLICATION NAME |
|---|---|---|
| 4 | 5 | WM |
| 6 | 7 | A |

FIG. 5A

205 EVENT TABLE

| EVENT # | EVENT INTERVAL TIME (ms) | PARENT WINDOW NAME | WINDOW NAME | RECEIVER | CONTENT | TYPE |
|---|---|---|---|---|---|---|
| -1 | 0 | Wp | Print | A | LeftPress | Mouse |
| -2 | 120 | Wp | Print | A | LeftRelease | Mouse |
| -3 | 80 | Root | Print? | WM | MapConfig | Window |
| -4 | 20 | Print? | Yes | A | MapConfig | Window |
| -5 | 20 | Print? | No | A | MapConfig | Window |
| -6 | 200 | Print? | Yes | A | LeftPress | Mouse |
| -7 | 30 | Print? | Yes | A | LeftRelease | Mouse |
| -100 | 10 | Wp | Print | A | LeftPress | Mouse |
| -101 | 130 | Wp | Print | A | LeftRelease | Mouse |
| -102 | 70 | Root | Paper? | WM | MapConfig | Window |
| -103 | 20 | Paper? | Cont. | A | MapConfig | Window |
| -104 | 20 | Paper? | Cancel | A | MapConfig | Window |
| -105 | 100 | Paper? | Cancel | A | LeftPress | Mouse |
| -106 | 30 | Paper? | Cancel | A | LeftRelease | Mouse |

FIG. 5B

211 EVENT DATA

| GENERATION INSTANT : 93.03.10.21.00.00.00 | WINDOW NAME : Print |
|---|---|
| CONTENT : MapConfig | PARENT WINDOW NAME : Root |

OPERATION MACRO GENERATED METHOD THAT CHANGES EXECUTION CONTROL ACCORDING TO SYSTEM SITUATION

BACKGROUND OF THE INVENTION

1. Filed of the Invention

The present invention relates to a computer program generating method, and more particularly to a method of generating, from a series of examples in which a user had operated an application program, an operation macroprogram which makes it possible to perform a similar operation again.

2. Description of the Related Art

As computers have spread widely in offices and so forth, even a user who is not an expert in programming, is requested to handle a completed application program. In using the application program, there is the case where the same operation must be repeated many times each time the program is used. If such a series of operations can be utilized as a program, it is convenient.

As a method of generating a program for automating the operation of an application program there has widely been used a method in which a so-called "program by example (PBE)" is generated from operations presently shown as examples. In this method, a series of examples in which a user had operated an application program are stored as a program so that they can be used again. To call this program suffices to perform the series of operations again. According to this method, a user does not need to have the knowledge of a programming language and has almost no need to input a program by use of a keyboard. In the following, a program generated from such operations shown as examples will be called an "operation macro" and a program for generating the operation macro will be called an "operation macro" generation program.

For example, "Microsoft Excel Users Guide" which is a table calculation application program developed by Microsoft Corp. in U.S.A., incorporates an operation macro generation program therein. Namely, as describe, on pages 450 to 458 of the manual "Microsoft Excel Users Guide" published in 1989, when a user successively indicates a plurality of operations for some cell data, an operation macro having the indicated operation train stored therein is automatically generated and it is possible from the next time on to indicate the same operation train for cell data with another value by calling the generated operation macro In "Excel", a basic system program for processing a signal from a hardware sends a keyboard operation or the like by a user to the Excel, and a processing to be performed for the operation is performed while it is stored as a command of the operation macro. Such each command of the operation macro incorporated in the application program is executed in accordance with the completion of execution of the preceding command.

Another example of an application program having an operation macro generation program is CCT-98-III developed Simple Language Manual developed by Gijijutsu Hyoron-sha. In substance, this is a communication program for allowing a user to use a computer in hands as a terminal of another computer. As described on pages 22 to 35 of CCT-98-III Simple Language Manual (published in 1991), which is the manual of that program, an operation macro is generated in such a manner that not only a series of user operations but also a response from a sender are stored together to be programed. For example, in the case where a user produces an operation macro for making a connection from a computer in hands to a remote computer, the mere sending of a user's input to the remote computer provides a problem. Since a communication between computers is made in accordance with a predetermined procedure, a receiver computer cannot receive the sent input from the sender computer even if it is sent from the sender computer if the receiver computer is not ready for reception. In the CCT-98-III, therefore, a step of confirming the completion of a remote computer's preparation for reception by a message output from the sender is incorporated in an operation macro to be generated, thereby succeeding in sending the input with a good timing always. For example, an operation macro generated in the case where during operations shown as examples a user ID is inputted in response to a message "Enter User ID" includes a step of sending the user ID inputted after waiting for the preceding message being outputted.

A program described by U.S. Ser. No. 07/589,405 filed Sep. 18, 1990 of the present applicants can also be called an operation macro generation program, the disclosure of which is incorporated herein by reference, and is not intended to be prior art. According to this program, a user produces an operation macro by use of different operation examples under various conditions, and the execution of the generated operation macro for another data is made with a control by which an operation corresponding to a condition on that occasion is performed.

An example of an operation macro generation program provided independent of an application program includes the product "Quickeys 2" of CE Software Inc. in U.S.A. This program is suitable for generating an operation macro from a user operation for an application program which has no operation macro generation program incorporated therein. Further, as described on 2–1 to 2–14 sections of the manual "Quickeys 2" (not pagenated) of the program, it is possible to generate an operation macro from a user operation over a plurality of applications as well as a user operation for one application program. The "Quickeys 2" can operate under the control of a window server to generate an operation macro for another application program which operates under window environments. In the "Quickeys 2" the storage is made at a point of time when the window server receives a keyboard operation by a user.

In the "Quickeys 2", an operation macro can be generated from a user operation performed for an application program which operates under window environments. However, under such window environments, a request for the generation or erasion of a window may frequently be made from the application as a response for the performance of a user operation. A macrocommand generated from a user operation inputted after the generation or erasion of the window on the basis of the request must be executed after the window generation or erasion even when the operation macro is executed. However, a time until the window is actually generated after the request for the window generation or erasion has been made, is not constant and differs depending upon the condition of a computer on that occasion. Accordingly, there results in that the macrocommand to be executed after the window generation or erasion is executed before the window generation or erasion.

In the "Quickeys 2", a time of wait for the execution of the next command can be designated by a user in the course of execution of a train of commands. In order that this advantage is used to solve the above-mentioned problem so that the macrocommand is executed after the completion of the window generation or erasion, it is necessary to designate the maximum designable wait time. However, in the case where such a time is designated, a long time may be consumed when the window generation or erasion is made at an early stage.

Further, there may be the case where a window, for which a request is made from an application program in response to a user operation, changes depending upon the operation environment of the application program at that time. Thus, there may be the case where a window different from a window generated upon generation of an operation macro is generated after the execution of that operation macro. Accordingly, it is not possible to obtain a normal result by merely executing the above-mentioned macrocommand after the window generation or erasion.

SUMMARY OF THE INVENTION

Thus, a first object of the present invention is to provide a method of generating an operation macro which makes it possible to dynamically wait for a message from a system program for control of the execution of a plurality of application programs to one application program.

A second object of the present invention is to provide a method of generating an operation macro which makes it possible to cope with a response message which changes depending upon conditions.

To attain the first object, according to one aspect of the present invention, an operation macro is generated in such a manner that a user operation for one application program made an object and a response message outputted from a system program for the application program are both stored. From the stored user operation, a command is generated which requests the application program for that user operation. From the stored response message, a command is generated which waits for the message being given from the system program to the application program.

With such a construction, it becomes possible to dynamically wait for a specified message from a system program for a specified application program.

To attain the second object, according to another aspect of the present invention, a plurality of operation trains are inputted under different conditions in which different messages from an application program are generated. A plurality of macros are generated from the inputted operation trains. The plurality of operation macros are generated so as to wait for the different messages from the application program.

With such a construction, in the case where a plurality of operation macros are used from a plurality of operation trains, the following is enabled. Namely, when the operation macros are executed and when a response message, for which one operation macro waits, does not come but another response message comes, an operation macro can be executed which waits for the other response message.

BRIEF DESCRIPTION OF THE DRAWINGS

FIGS. 4A and 4B are diagrams showing a window table produced in the present embodiment;

FIGS. 5A and 5B are diagrams showing an event table produced in the present embodiment;

DESCRIPTION OF THE PREFERRED EMBODIMENTS

An embodiment of the present invention will now be explained by use of the accompanying drawings.

Figure 1:
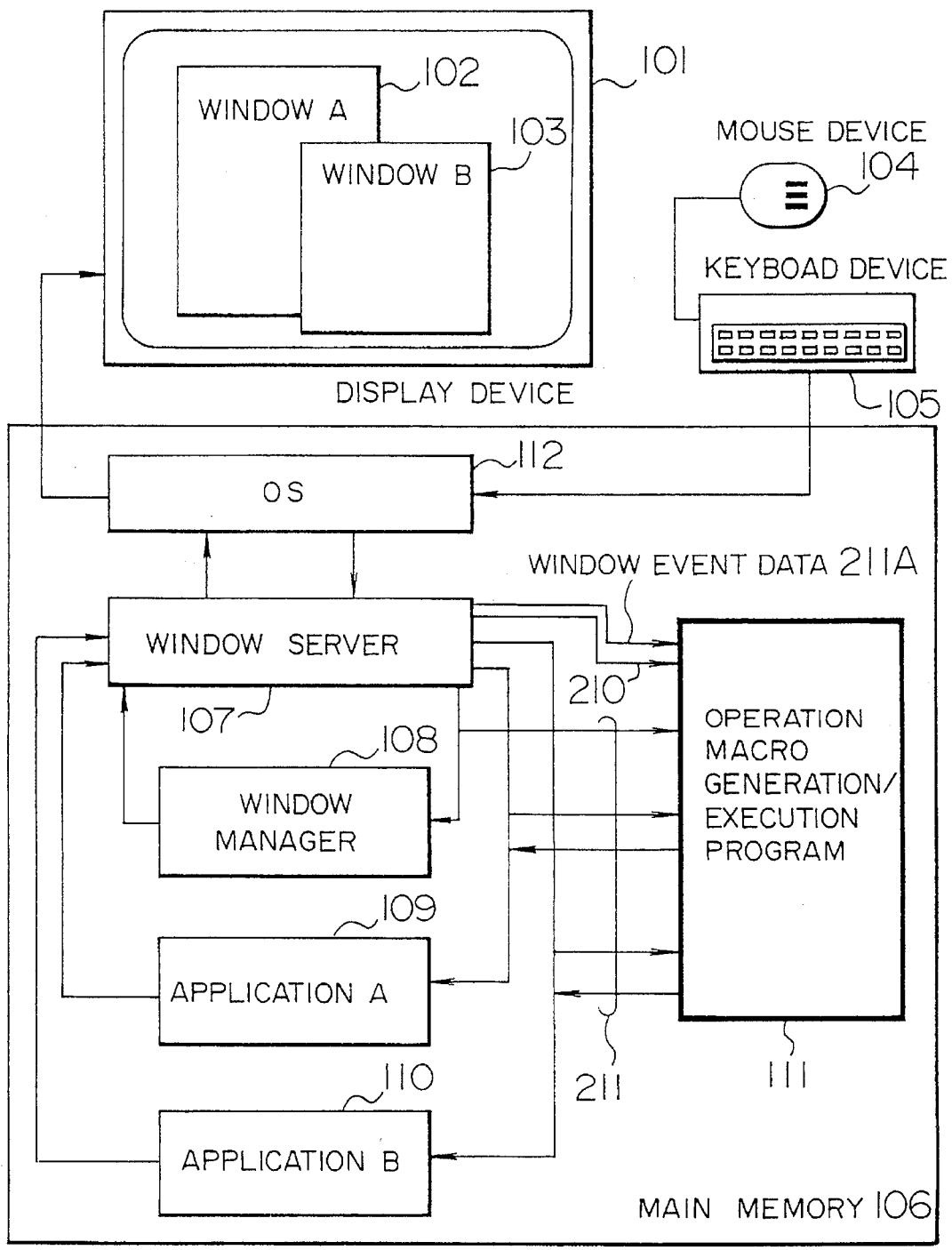
FIG. 1 is a block diagram showing the overall construction of an embodiment of the present invention.

FIG. 1 shows the overall construction of this embodiment. An operation environment is one which has been developed by Massachusetts Institute of Technology in U.S.A. and is employed in many computers. The shown example of realization has a window server 107 of an X window system as a basic system. The outline of the whole of this window system is described on pages 1 to 8 of "Xlib Programming Manual" published by O'Reilly & Associates, Inc. in 1989.

A user can see rectangular regions 102 and 103 called windows in a display device 101. These windows 102 and 103 are execution images corresponding to application programs A (109) and B (110), respectively. The user can visually confirm the states of execution of the applications. Also, the user can input the setting of data for execution and an instruction for execution for those windows by use of a mouse device 104 or a keyboard device 105.

The general flow of a program processing will be shown in the following. In a main memory 106, the window server 107 receives a user's input from the keyboard device 105 or the mouse device 104 managed by an OS 112. When an input by, for example, the keyboard is made, the window server 107 interprets the input as being destined for a front window nearest to the user side (or the window B 103 in the case of FIG. 1) and sends the result of interpretation to the application B 110. Such information is called event data. When receiving the event data, the application B 110 performs a proper processing in accordance with the contents of the event data and makes a request to the window server 107 again if circumstances require. In the case where the request includes a change in window image, the window server 107 provides an instruction for a proper depiction to the display device 101. This instruction is sent to the OS 112 which in turn outputs a depiction request to the display device 101.

In the X window system, the movement of a window and/or a change of the size of the window are possible without informing or notifying each application program of them. A control for this purpose is performed by a program called a window manager 108. When seen from the window server 107 which is the basic system, this program is one application program. In the case where an independent window is newly produced, this information is given to the window manager 108 from the window server 107 and the window manager 108 prepares a control mechanism by which a user can make the movement of a window and/or a change of the size of the window freely.

In the present embodiment, an operation macro generation/execution program 111 is added as a new element. According to the operation macro generation/execution program 111, there are stored a train of operations which a user has performed for the window 102 or 103 by use of the mouse device 104 or the keyboard device 105. Also, an operation macro for performing again those operations is identified and the operation macro is generated. Therefore, two improvements are made to the window server 107.

A first improvement lies in that when an application program is activated so that a request for connection to the window server 107 is issued, the operation macro generation/execution program 111 is informed of the request. In the following, this information or notice will be called a connection request 210. The program 111 is notified of window event data 211A (FIG. 2) which is issued from the window server 107 in response to a request from an application program.

A second improvement lies in that in the case where an event data 211 is sent from the window server 107 to each application program, the event data is also sent to the operation macro generation/execution program 111.

Figure 2:
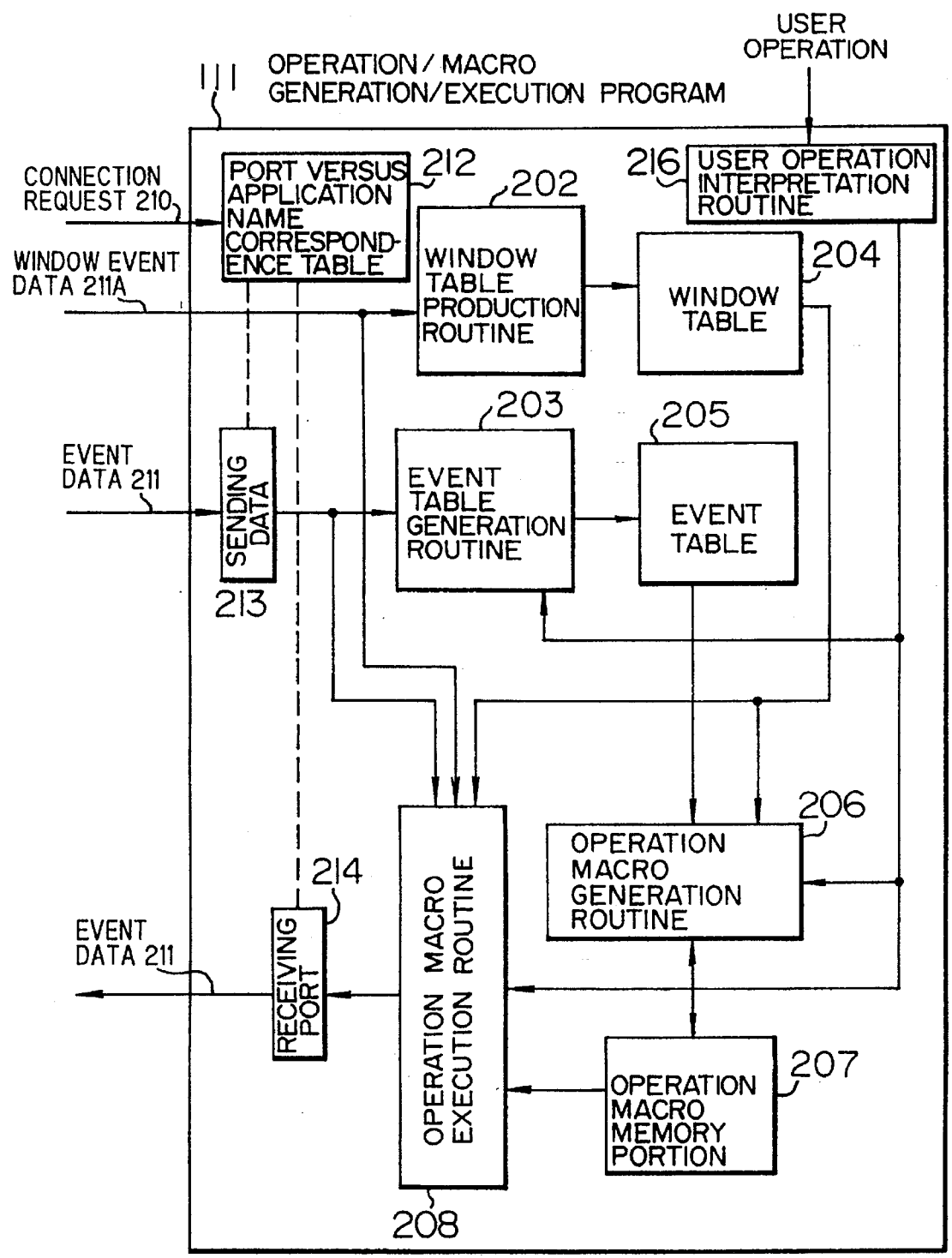
FIG. 2 is a block diagram showing the detailed construction of an operation macro generation/execution program shown in FIG. 1.

FIG. 2 shows the construction of the operation macro generation/execution program 111. The program 111 receives the connection request 210 and the event data 211 and 211A from the window server 107. The connection request 210 is used for producing a port versus application name correspondence table 212. The event data 211 and 211A are sent to a window table production routine 202, an event table production routine 203, respectively and are sent to an operation macro execution routine 208.

With the window table production routine 202, a window table 204 is controlled by the received event data 211A. The table 204 is provided for accurately grasping a window construction on the display device 101 on the operation macro side.

With the event table production routine 203, information concerning the event data 211 sent from the window server 107 is stored into an event table 205. In the present embodiment, the routine 203 stores information concerning all sent event data.

With an operation macro generation routine 206, an operation macro is generated referring to the window table 204 and the event table 205 and is then stored into an operation macro memory portion 207.

With the operation macro execution routine 208, the operation macro is taken out of the operation macro memory portion 207 so that the operation macro is executed referring to the window table 204.

Figure 14:
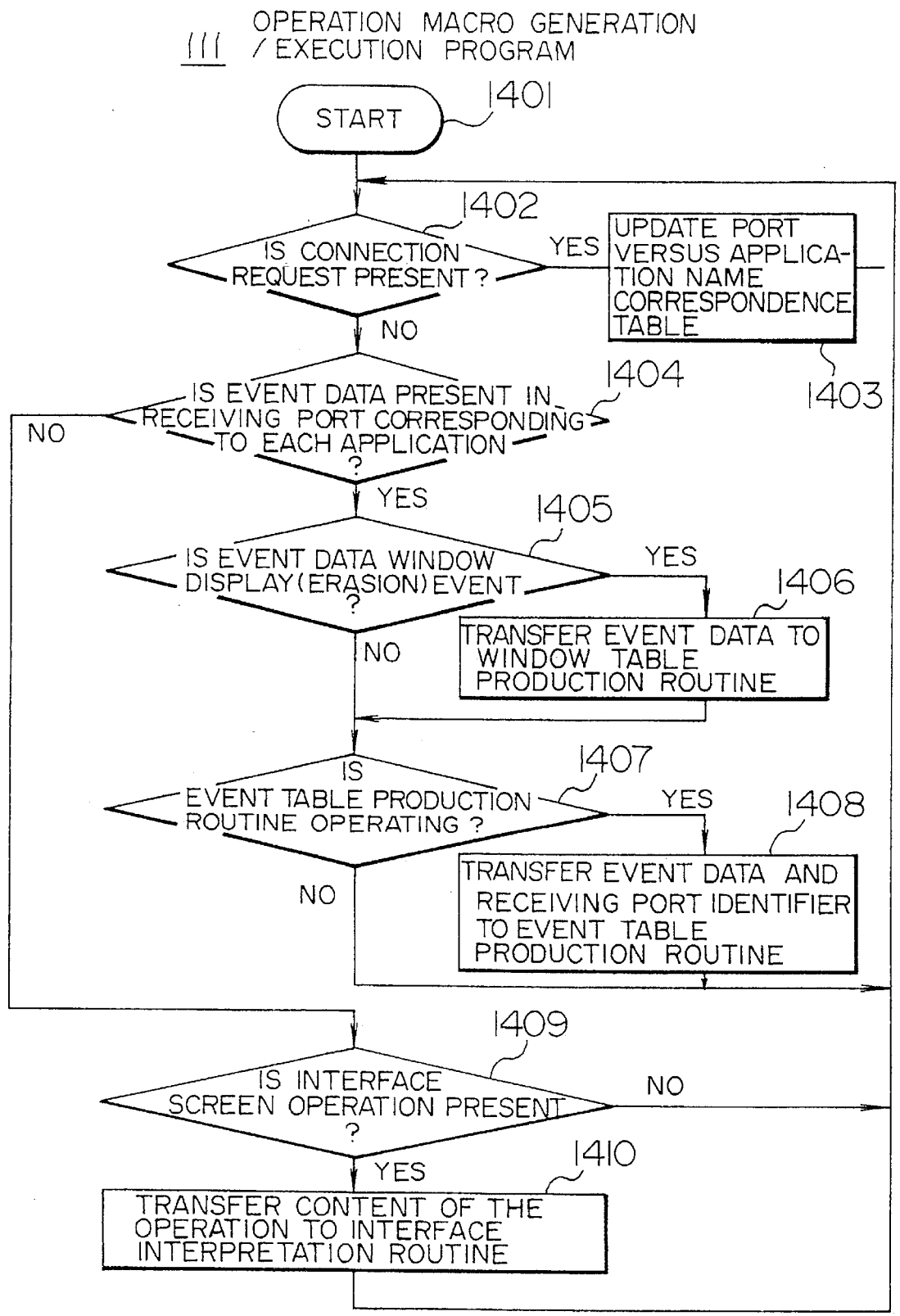
FIG. 14 is a flow chart of an operation macro generation/execution program.

A flow chart of the operation macro generation/execution program 111 is shown in FIG. 14. The actual flow of a processing will be explained in a specific example which will be mentioned later on.

Explanation will now be made using a specific example. It is assumed that the application A 109 is a simple word processor. In the present embodiment, there is generated an operation macro which makes the application A 109 an object. And, the window manager (WM) 108 is also made an object in order to execute the operation macro. For simplification of explanation, it is assumed that a window B corresponding to the application B shown in FIG. 1 is not displayed and hence an operation for the window B is not taken into consideration. It is also assumed that the application A 109 is activated in a state in which the window manager 108 has already been activated.

Figure 3:
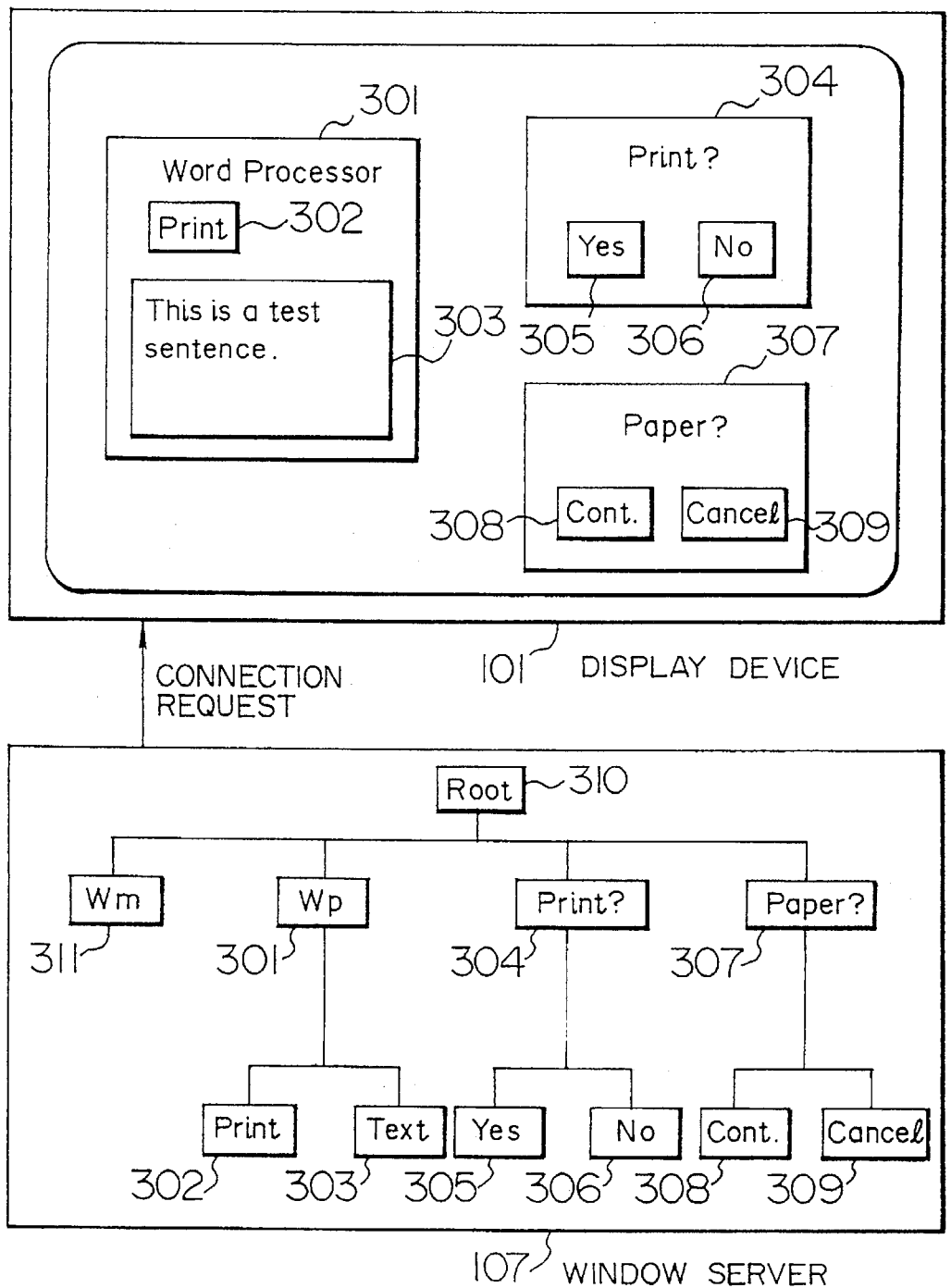
FIG. 3 is a diagram showing the display and construction of windows produced in the present embodiment.

The outline of a processing performed by the application A will now be mentioned briefly. This program is composed of a body window 301 (Wp) and two dialogue windows 304 (Print?) and 307 (Paper?), as shown in an upper portion of FIG. 3. First, only the Wp window 301 is displayed on the display device 101. A user inputs a text (in the shown example, a train of characters as shown on a display screen) into a window 303 (Text). In the case where a document thus produced is to be outputted to an externally connected printer device (not shown), a window 302 is selected by a mouse. If the printer device is ready, the dialogue 304 (Print?) is displayed and the printing is made by selecting a window 305 (Yes) in the dialogue 304 by the mouse. In the case where a paper for the printer is out, the dialogue 307 (Paper?) is displayed. If a paper is supplied to the printer device and a window 308 (Cont.) in the dialogue 307 is selected by the mouse, the printing is made. If a window 309 (Cancel) is selected by the mouse, the printing is stopped. It is assumed that windows have a hierarchical relationship therebetween as shown in a lower portion of FIG. 3. This relationship is managed in the window server 107.

Immediately after the application A 109 is activated, the application makes a connection request 210 to the window server 107. By this request, the window server 107 opens two communication ports for communication with the application. In the case where the application makes a request for window production or the like, this request is written into a sending port. When reading the request from the sending port, the window server 107 performs a processing corresponding to the read request and writes the result of processing into a receiving port on the application side. By reading the contents written in the receiving port, the application detects the execution of the request.

With the first change mentioned above, the window server 107 informs the operation macro generation/execution program 111 of the connection request 210 in the case where the window server 107 receives the connection request 210 from the application. At this time, a new communication port (called an identifier 6) is produced in the window server 107. And, the operation macro generation/execution program 111 is informed of an application name (A), the identifier (6) of the produced communication port and an identifier (called an identifier) of a communication port for writing in the application.

When the operation macro generation/execution program 111 receives the connection request 210 (step 1402 in FIG. 14), the port versus application name correspondence table is updated by use of the connection request (step 1403). This processing of updating is performed as follows. The operation macro generation/execution program 111 extracts from the connection request the application name (A), the identifier (6) of the communication port newly produced in the window server 107 and the identifier (7) for writing in the application. The port 6 is a receiving port 213 for the operation macro generation/execution program 111, and the port 7 is a sending port 214 for the operation macro generation/execution program 111. The port versus application name correspondence table 212 is a table indicating a correspondence between the two identifiers (6 and 7) and the application name (A).

The port versus application name correspondence table 212 is composed of a receiving port item 410, a sending port item 411 and an application name item 412, as shown in FIG. 4B. One row in the table includes information concerning one application. The first row in the table shown in FIG. 4B shows that event data 211 inputted from a port 4 is destined for the window manager 108 and the event data 211 can be sent to the window manager 108 if it is written in a port 5. Similarly, the second row in the table shows that event data 211 inputted from a port 6 is destined for the application A 109 and the event data 211 can be sent to the application A 109 if it is written in a port 7.

In the case where a user operates the mouse device 104 or the keyboard device 105 to provide an instruction to each application, the window manager 107 interprets the operation to convert the result of interpretation into event data 211 and sends the event data 211 to each application. A principal structure of the event data 211 is shown in FIG. 5B. From the event data 211 can be obtained a generation instant 510 representing an instant of time at which an operation was generated, a content 511 representing the contents of the operation, a window name 512 representing a window for which the operation was generated, a parent window name 513 representing a parent window of the window for which the operation was generated, and so forth. The example shown in FIG. 5B shows that an event was generated at 21.00.00.00 on Mar. 10, 1993 and the contents of the operation are such that a window having a name of Print was displayed or Map(ped) with a Root window taken as a parent window. By this event, the application is informed of the actual display of the Print window on the display screen. With the second change of the window server 107 as mentioned earlier, all the event data 211 are also sent to the operation macro generation/execution program 111.

After the application A 109 has been activated, the window server 107 is requested to produce a window to be used by the program. In the present embodiment, the window server 107 is requested to produce a Wp window 301 which is a main portion of a word processor and a Print window 302 and a Text window 303 which are subwindows of the Wp window 301. This request is processed by the window server so that the windows are displayed on the display screen of the display device 101.

If the display of the windows is made, each application is informed of the effect of display as event data. This information is given since each application necessitates another processing associated with the display of the windows. In the present case, three event data corresponding to the three windows are sent.

First event data of the effect that the Wp window 301 was displayed, is sent to the window manager 108. The first event data is shown in FIG. 5B. With this transmission, the window manager 108 prepares a control mechanism by which a user can change the size and/or position of the window.

Second and third event data of the respective effects that the Print window 302 and the Text window 303 were displayed, are sent to the application A 109.

Those three event data are sent to the operation macro generation/execution program 111 as well as each application. The transmission destined for the window manager 108 is made using the port 4, and the transmission destined for the application A 109 is made using the port 6.

When receiving the first event data shown in the above (step 1404 in FIG. 14), the operation macro generation/execution program 111 transfers this event data to the window table production routine 202 (step 1406) since the event data is a window display event (step 1405).

Figure 15:
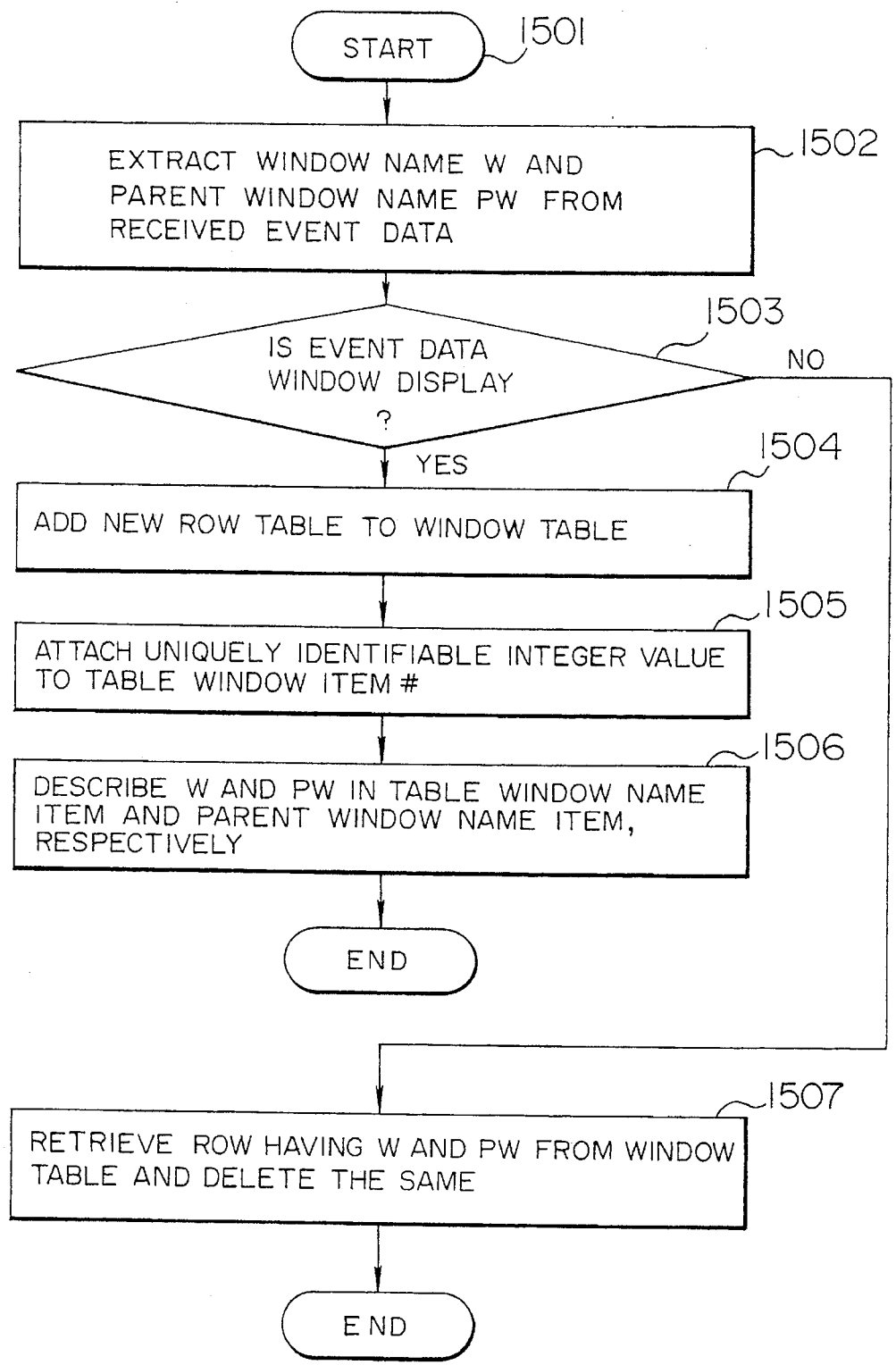
FIG. 15 is a flow chart of a window table production routine.

The window table production routine 202 extracts a window name (Wp) and a parent window name (Root) from the received event data (step 1502 in FIG. 15). Since the event data is a window display event (step 1503), a new table row is added to the window table 204 (step 1504). And, a uniquely identifiable integer value (2) is provided to a window # item (step 1505). Also, "Wp" and "Root" are provided to a window name item and a parent window name item of the table, respectively (step 1506). With this series of steps, there results in the description of the third row of the window table 204 (see FIG. 4A). Similarly, with the second and third window display event data, the fourth and fifth rows of the window table 204 are described. The contents of the window table 204 produced until now are as the interior of a thick frame 405 shown in FIG. 4A.

A user performs the following operations in order to provide a printout on the word processor:

(1) selecting the Print window 302 by the mouse; and (2) selecting, if the Print? dialogue 304 is displayed as the result of the operation (1), the Yes window 305 in the dialogue 304.

The above operations are ones in the case where a printer device is ready. Another operation becomes necessary according to the state of the printer. One example thereof or operations in the case where the printer device is out of a paper, are as follows:

(1)' selecting the Print window 302 by the mouse; and (2)' selecting, if the Paper? dialogue 307 is displayed as the result of the operation (1), the Cancel window 309 in the dialogue 307.

In the following, detailed explanation will be made of processings in which operation macros are generated from a series of operations (1) and (2) and a series of operations (1)' and (2)' and they are executed.

Figure 6:
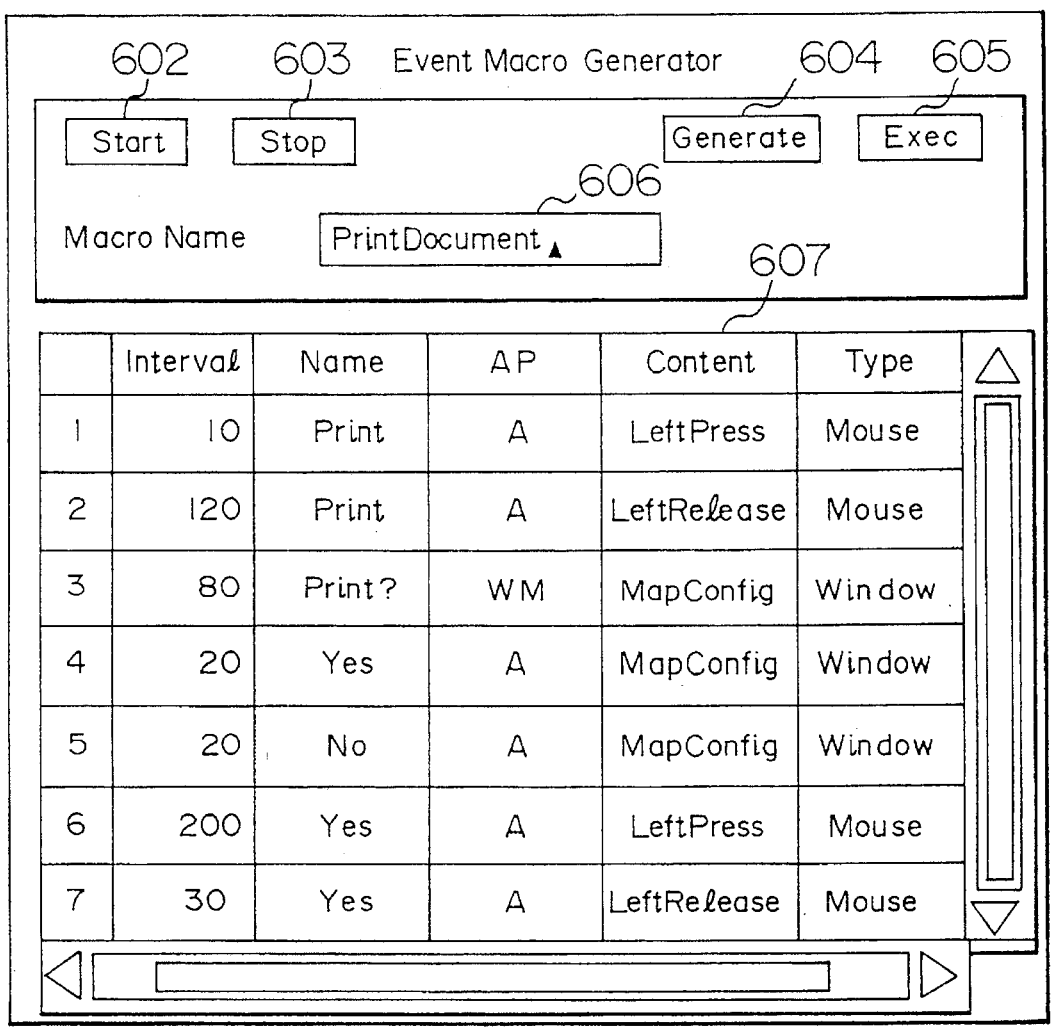
FIG. 6 is a diagram showing an interface screen of an operation macro generation/execution program shown in FIG. 2.

Prior to an operation, a user provides an instruction for the start of the event table production routine 203. The start and stoppage of the event table production routine and the generation and execution of an operation macro are made by user's instructions. An example of the interface screen of the operation macro generation/execution program 111 for providing such an instruction is shown in FIG. 6. In the display screen are arranged a Start button 602 and a Stop button 603 which indicate the start and stoppage of the event table production routine 203, a Generate button 604 which indicates the generation of an operation macro, and an Exec button 605 which indicates the execution of the operation macro. The name of an operation macro to be generated and executed is inputted into an input region 606. The contents of the event table 205 are displayed on a region 607. Any row in the region 607 can be selected by a mouse.

An example of the contents of the event table 205 is shown in FIG. 5A. The table is composed of an event # item 501 representing an ID in the table, an event interval time item 502 representing an event interval time in units of milliseconds, a name item 504 of a window which sends an event, a name item 503 of a parent window of that window, a receiver item 505 representing an application to which the sending is to be made, a content item 506 representing the contents of the event, and a type item 507 representing an input source.

An ID for uniquely identifying the contents of the event table 205 is described in the event # item 501. A number is given as the ID in the order of input. The number starts from −1 and decreases one by one. The case where an event # is a negative integer value, means that the corresponding table row is invalid. By selecting a proper row in the event table by use of a mouse on the interface screen shown in FIG. 6, a user can invert the sign of the event #. In the case where an event # takes a positive integer value in such a manner, the corresponding row is made valid. Upon event table production, all event table rows are invalid. Reference to valid event table rows is made when an operation macro is to be generated. Invalid event table row are neglected.

Figure 7:
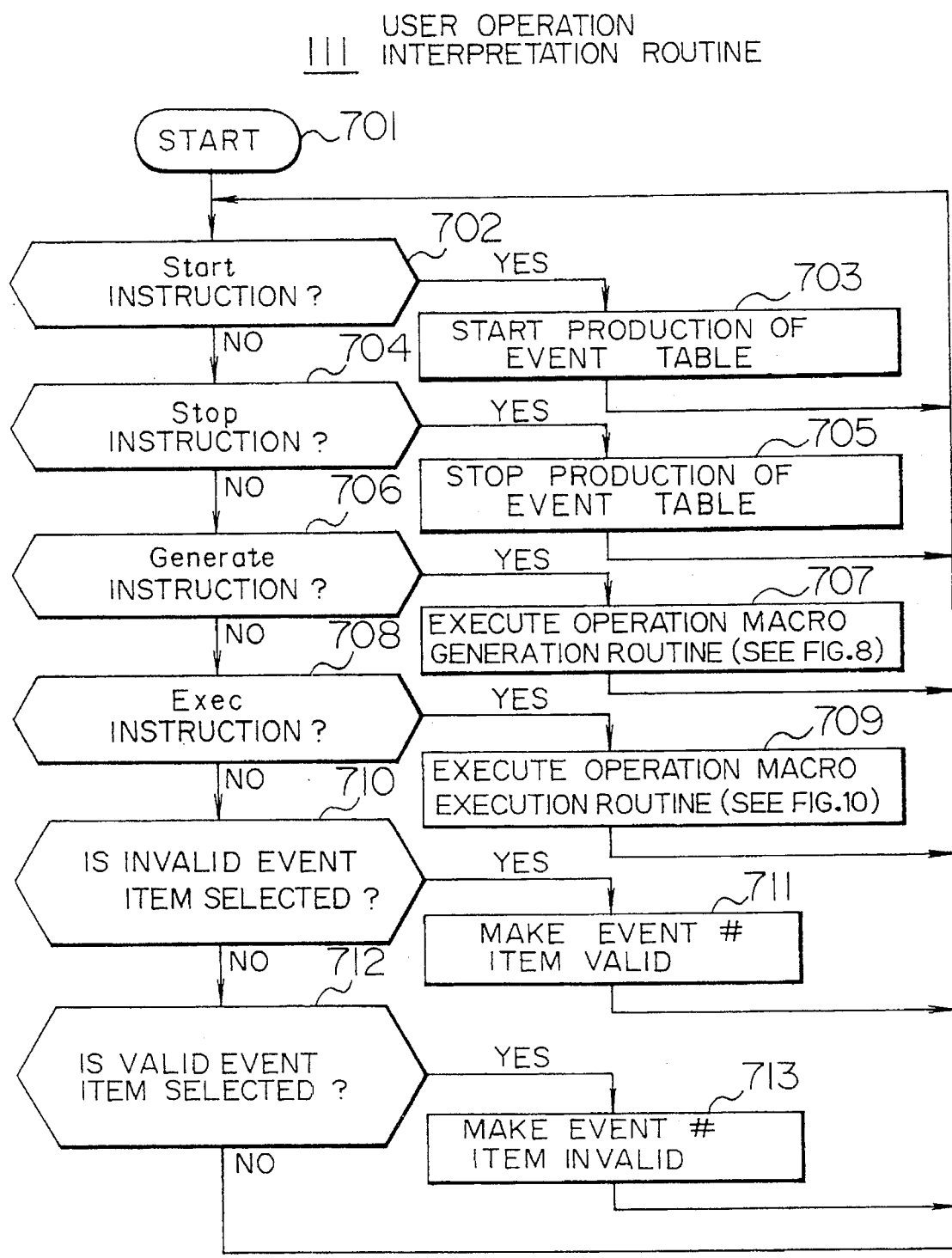
FIG. 7 is a flow chart of the operation macro generation/execution program shown in FIG. 2.

FIG. 7 shows an operation in the case where a user operates the interface screen shown in FIG. 6. If the Start button is selected by a mouse to provide an instruction for start (step 702), an event table production routine is started (step 703). If the Stop button is selected to provide an instruction for stoppage (step 704), the routine is stopped (step 705). If the Generate button is selected to provide an instruction for generation (step 706), an operation macro is generated (step 707). If the Execute button is selected (step 708), the operation macro is executed (step 709). In the case where an event # item is selected by the mouse and the selected event # item is invalid (step 710), the sign of the event # item is inverted to make the event # item valid (step 711). If the selected event # item is valid (step 712), it is made invalid (step 713).

Next, an operation until the generation of a macro from the operations (1) and (2) will be explained. The explanation will separately be made of a portion of the operation until the event table 205 is generated from the operations (1) and (2) and an operation portion until a user selects a valid event row from the event table 205 to generate a macro from the valid portion or row.

Figure 16:
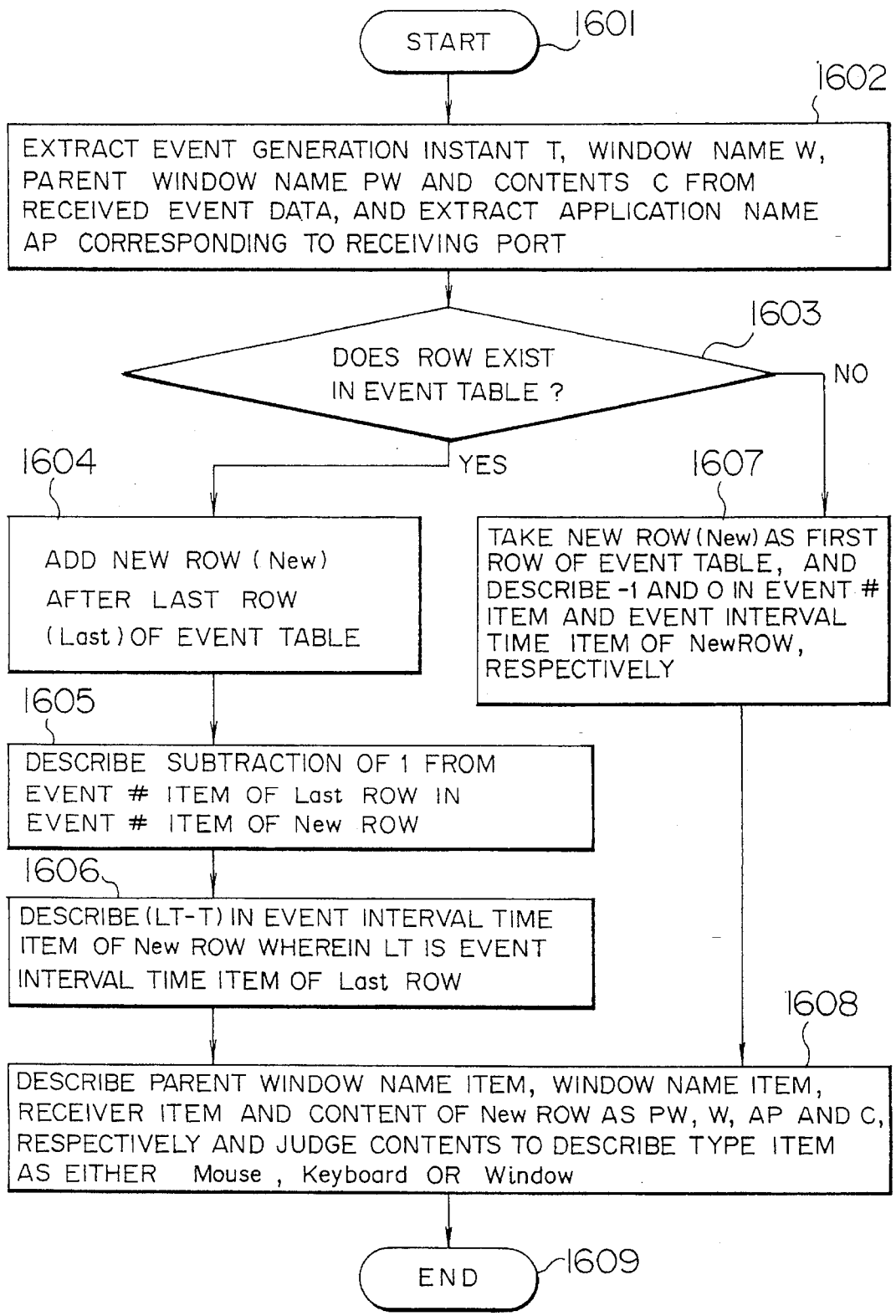
FIG. 16 is a flow chart of an event table production routine.

First, the generation of the event table 250 from the operation (1) will be mentioned. The flow of a processing of the event table production routine 203 is shown in FIG. 16. The operation (1) includes selecting by a mouse the Print window whose parent window is Root. An operation actually performed by the user includes pressing a left button of the mouse on the Print window 302 and releasing the button on the same window.

When the operation is performed, an operation signal is sent to the OS 112 which controls the mouse device 104. The OS 112 transfers the operation signal to the window server 107. The window server 107 interprets from this signal a position of the operation performed and the contents of the operation to judge which window the operation was performed on. In the present case, since the operation is performed on the Print window 302, information of the contents of the operation on the window 302 is given to the application A 109 which is a producer of this window. Also, the same contents are sent to the event table production routine 203 in the operation macro generation/execution program 111 by use of the port 6. The contents includes an instant of time at which the operation was performed, the name of a window (or Print), the name of a parent window (or Wp), and the contents of the operation (or LeftPress and LeftRelease).

When receiving the event data, the operation macro generation/execution program 111 transfer the event data to the event table production routine 203 (step 1408 in FIG. 14) since the event data is not a window display event (step 1405) but the event data production routine 203 is operating (step 1407).

The event table production routine 203 extracts the event generation instant T, the window name W, the parent window name PW and the operation content C from the event data. Also, since the event data 211 is sent from the receiving port 6, it is recognized from the port versus application name correspondence table 212 that the name of an application made the object is A. See step 1602 in FIG. 16.

Since no row exists in the event table 205 until now (step 1603), a new row is produced so that the event # item 501 is described as −1 and the event interval time item 502 is described as 0 (step 1607). Also, the parent window name item 503, the window name item 504, the receiver item 505 and the content item 506 are described as "Wp", "Print", "A" and "LeftPress", respectively. Further, since the content item concerns a mouse event, the type item 507 is described as "Mouse" (step 1608). In this manner, the first row of the event table 205 shown in FIG. 5A is described.

The next event is the release of the mouse button. From this event data 211, an event generation instant and so forth are determined in a manner similar to that mentioned above (step 1602). Since a row now exists in the event table, a new row is produced (step 1604) and −2 is described in the event # item of this row (step 1605). Also, an event generation instant is described determining a subtraction from that of the preceding row (step 1606). The contents of this row are described in a manner similar to that mentioned above (step 1608). Thus, the second row of the event table 205 is described.

From the contents of the event data sent to the application A 109 as the result of the operation (1), this application requests the window server 107 to open the Print? window 304 with a Root window taken as a parent window. Receiving this request, the window server 107 produces this window.

Further, the application A requests the window server 107 to open both the Yes window 305 and the No window 306 with the Print? window 304 taken as a parent window. Receiving this request, the window server 107 produces those windows. As the result of production, the windows appear in a form displayed on the display screen.

The window manager 108 is informed of event data of display of the Print ? window 304 which becomes event data to the window manager 108. Information of appearance of the Yes window 305 and the No window 306 is given as display event data 211 to the application A to which the Print? window 304 managing or controlling those windows belongs. Those event data are sent to each application and the operation macro generation/execution program 111.

Since the window display event is thus received by the operation macro generation/execution program 111, the program 111 transfers it to the window table production routine 202 (step 1406 in FIG. 14). This routine performs the updating of the window table 204, as has been explained earlier. The result of updating is reflected in rows in FIG. 4A having the window # items of 5, 6 and 7. Also, since the event table production routine 203 is operating, the event data 211 is transferred to this routine 203 (step 1408).

Receiving the three window events, the event table production routine 203 produces a new event row (step 1604 in FIG. 16). A difference between the instant of generation of this event and the instant of generation of the preceding event, a parent window name, a window name and a content are described in each item of the new row. The content item 504 is described as "MapConfig" in order to indicate that the windows were actually produced. Also, the type item 507 is described as "Window" because of a window generation event. The contents of the event table produced corresponding to the above information are shown in the third, fourth and fifth rows.

The details of the user operation (2) will not be mentioned since it is similar to the selection of the Print window 320 by the mouse in the operation (1). By the operation (2), the sixth and seventh rows of the event table 205 shown in FIG. 5 are produced. The whole of the event table 205 produced by the operations (1) and (2) is shown in a thick frame 508 in FIG. 5A.

Next, explanation will be made of the operation portion in which an operation macro is generated from the event table 205.

The user selects the event # items in the thick frame of the event table 205 stored until now to make these valid event table rows valid. As a result, the event # items of the event table content display region 607 on the interface screen 601 are changed to positive values.

The name of an operation macro to be generated is termed "PrintDocument". Then, this name is inputted into the operation macro name input region 606 on the interface screen 601 and an operation macro generation instruction or Generate instruction is made. Thereby, an operation macro with the user operations (1) and (2) taken as an example is generated (step 707 in FIG. 7). Next explanation will be made of a processing until the macro is generated by this step.

Figure 8:
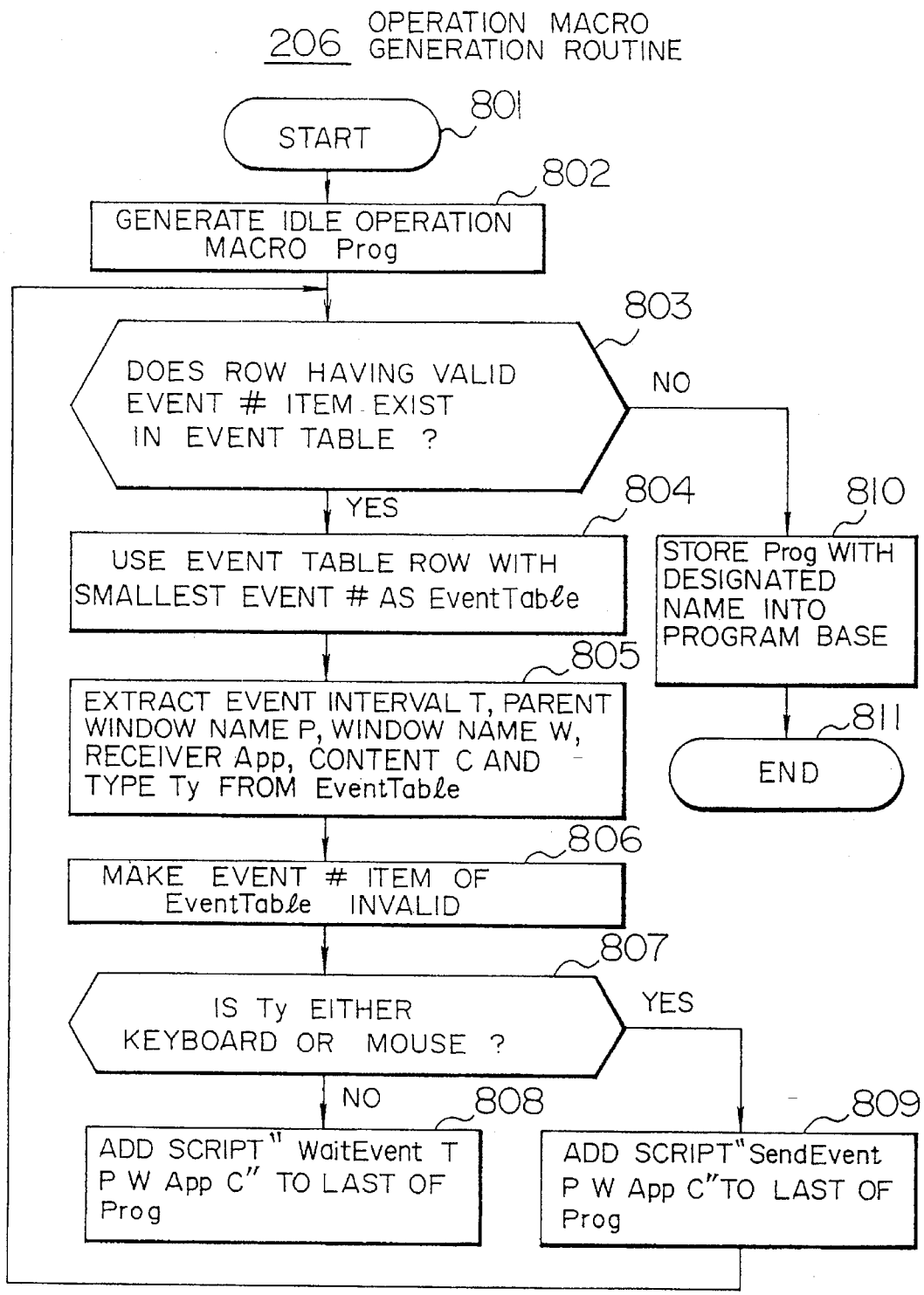
FIG. 8 is a flow chart of an operation macro generation routine in the processing shown in FIG. 7.

FIG. 8 shows the operation macro generation routine 206. In the present case, the name of an operation macro is "PrintDocument". At the beginning of the processing, an idle operation macro Prog is generated (step 802). This means that nothing is done if the case is left as it is.

Next, the judgement is made of whether or not a row having a valid event # item exists in the event table 205 (step 803). In the present case, such rows exist in the first thick frame 508 shown in FIG. 5A. The contents of that one of rows with valid event # items which has the smallest event #, are used as the values of a variable EventTable (step 804). In the present case, the row having the event # of 1 corresponds to such a row.

Next, a time T, a parent window name P, a window name W, a receiver Ap, a content C and a type Ty are extracted from the respective items of the EventTable (step 805). In the present case, T, P, W, Ap, C and Ty are "10", "Wp", "Print", "A", "LeftPress", "Wp" and "Mouse", respectively.

The sign of the event # item of the selected EventTable is inverted to make it invalid (step 806).

Since Ty is Mouse (step 807), the script

"SendEvent Wp Print A LeftPress" is added to the Prog operation macro (step 809). This script means "produce event data indicating the pressing of the left button of the mouse on the window Print a parent window of which is Wp, and send the event data to the application A".

The same flow is repeated so that the script

"SendEvent Wp Print A LeftRelease"

is added to Prog from the row of the event table 205 having the event # of 2. This means an instruction of producing event data indicative of the release of the left button of the mouse on the same window and sending the event data to the application A.

For the row of the event table 205 having the event # of 3, since the type is not Keyboard or Mouse but Window (step 807), the script "WaitEvent 80 Root Print? WM MapConfig" is added to Prog. This script means "wait for the sending of an event indicative of the display for the window Print? the application of which is the window manager 108 and the parent window of which is Root". Also, the time 80 ms is given as reference data upon execution.

When a processing for the last event data row in the thick frame 508 in FIG. 5A is thus completed, a row having a valid event # item runs out now (step 803). Then, Prog is stored with the name of "PrintDocument" into the operation macro memory portion 207 (step 810), thereby completing the operation macro generation routine 206 (step 811).

Figure 9:
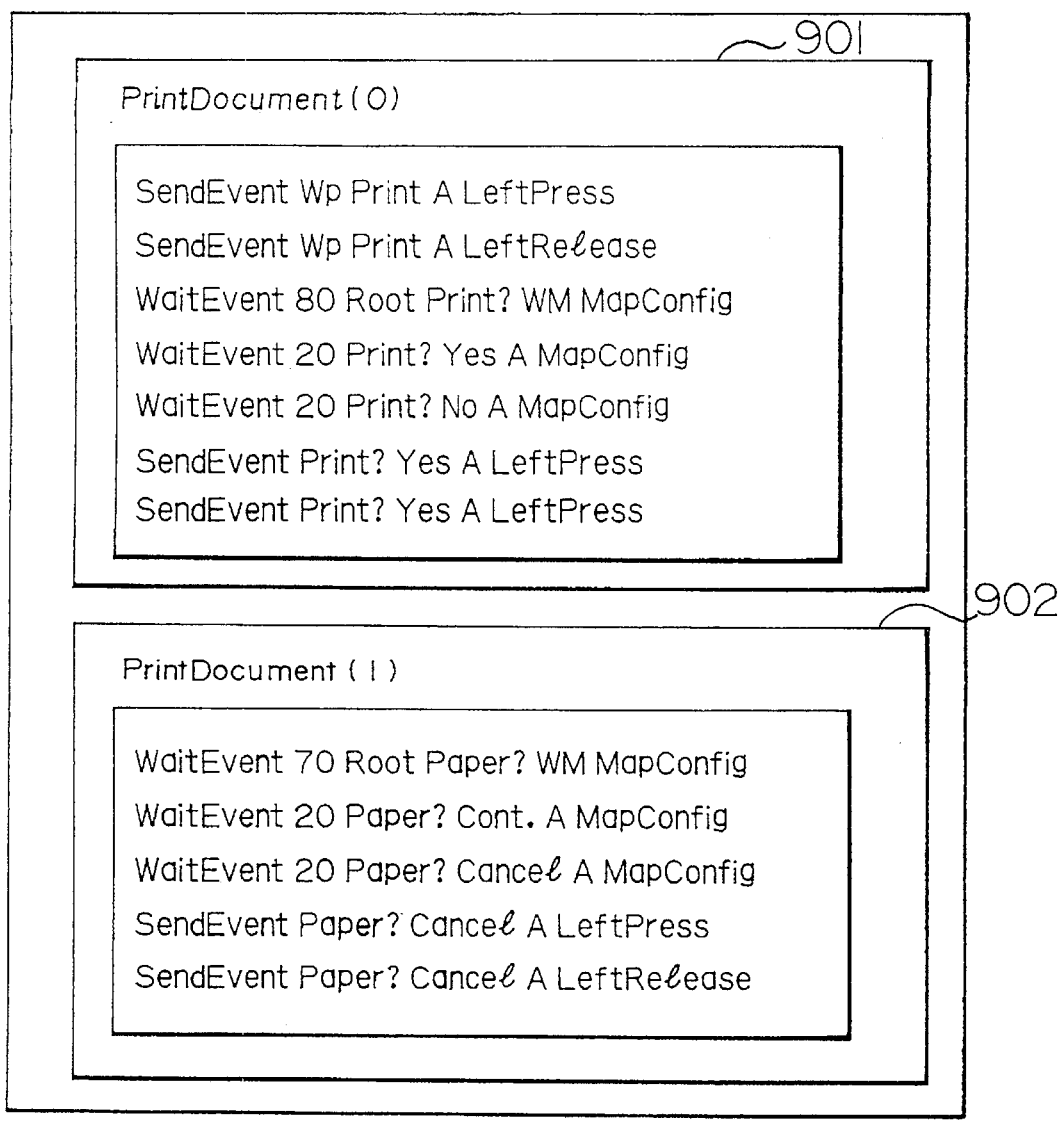
FIG. 9 is a diagram showing an operation macro generated in the present embodiment.

The generated operation macro is shown by 901 in FIG. 9. In the actual operation macro memory portion 207, macroprograms stored with the same name are numbered in the order of storage. Therefore, the generated operation macro has a name of "PrintDocument (0)".

Next, explanation will be made of the generation or production of the event table 205 from the operations (1)' and (2)' and the generation of a macro.

Though the operation (1)' is the same as the operation (1), the operation (1)' is under the condition in which the printer device is out of a paper. Therefore, the application A requests the window server 107 to produce not the Print? window 304 shown in the above example but the Paper? window 307.

After the window server has performed a window production processing, each application and the operation macro generation/execution program 111 are informed of window events. From these events, the window table production routine 202 adds new rows to the window table 204. The new rows are rows in FIG. 4A which have the window # items of 8, 9 and 10.

The contents of the generated event table 205 are rows in FIG. 5A which have the event # items 501 of −100 to −106. A portion of those rows shown by a thick frame 509 is different from the rows generated from the operations (1) and (2).

Only the interior of the thick frame 509 shown in FIG. 5A is designated as valid event rows. And, an operation macro is generated with the same name "PrintDocument". The procedure for generation of the operation macro is similar to that explained above. Since this operation macro is the second one generated with the same name, the operation macro name is "PrintDocument (1)".

The contents of the operation macro generated from the operations (1)' and (2)' are shown by 902 in FIG. 9. Since the two programs 901 and 902 concern operations originated from the common purpose of execution of printout, they are stored with the same name and are numbered in the order of generation.

In the foregoing, the explanation has been made of the operation until the generation of the operation macro. Next, explanation will be made of the execution of the operation macro stored in the operation macro memory portion 207. The execution is made in such a manner that the user selects the Execute button 605 in FIG. 6 by the mouse, as has been explained in conjunction with step 709 in FIG. 7. Now assume the execution of the "PrintDocument" operation macro used in the foregoing explanation.

Figure 10:
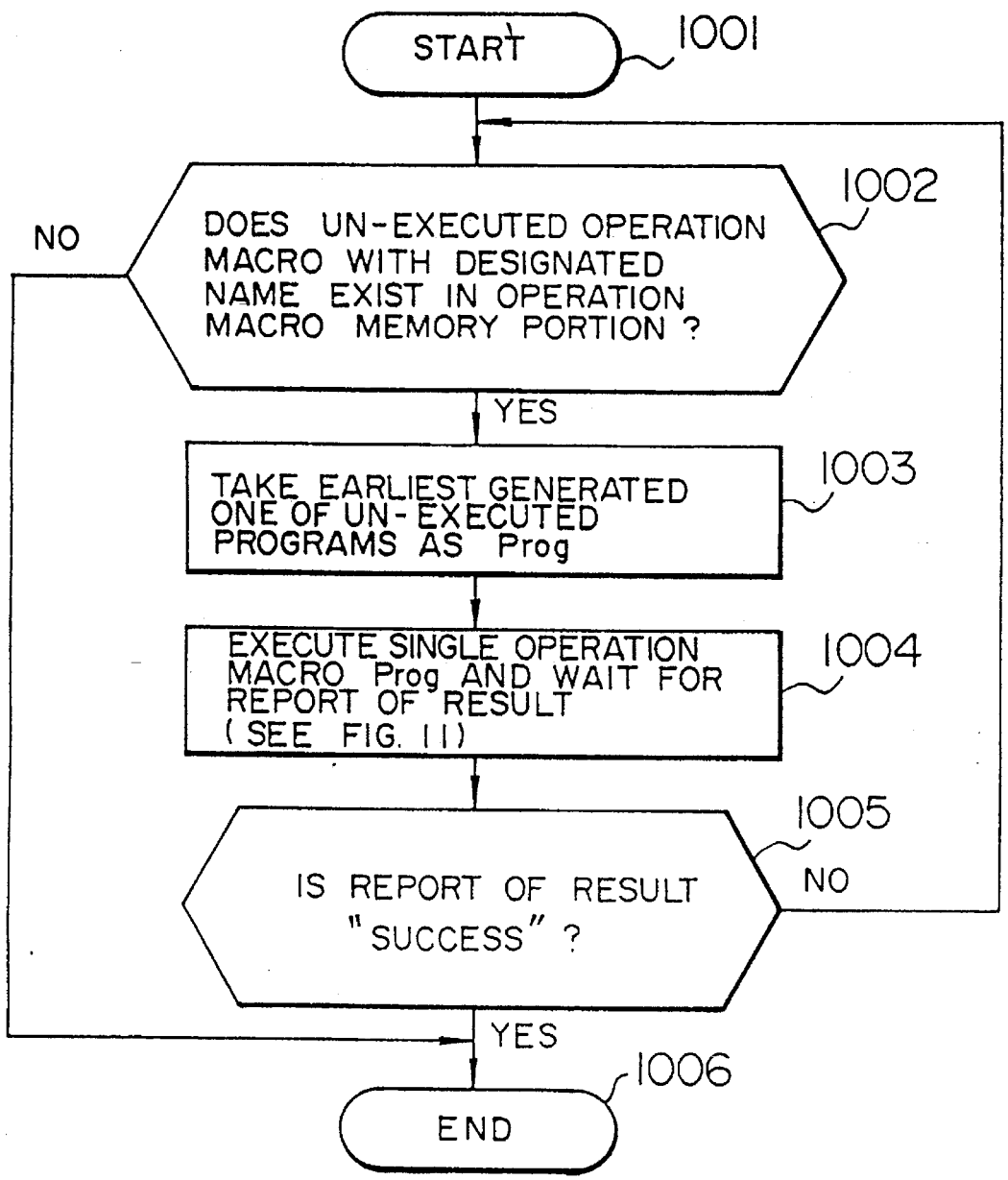
FIG. 10 is a flow chart of an operation macro execution routine in the processing shown in FIG. 7.

FIG. 10 shows the flow of a processing for executing an operation macro with the name thereof being given. First, the judgement is made of whether or not the operation macro memory portion 207 has therein an operation macro which has a name of "PrintDocument" and has not yet been executed (step 1002). In the present case, two operation macros of "PrintDocument (0)" and "PrintDocument (1)" exist.

The earliest generated one of those operation macros is taken as Prog (step 1003). In the present case, the earliest generated macro is "PrintDocument (0)".

This Prog, which will be called a single operation macro, is executed (step 1004).

The result of execution is certainly either "success" or "failure", as will be explained later on. If the result is "success" (step 1005), the execution of the operation macro is completed. This means that "PrintDocument (0)" was normally completed. If the result is "failure", "PrintDocument (1)" is taken as the next single macro Prog and is executed. This corresponds to the case where a normal printout cannot be executed and means that the printout is withdrawn if the printer device is out of a paper.

Figure 11:
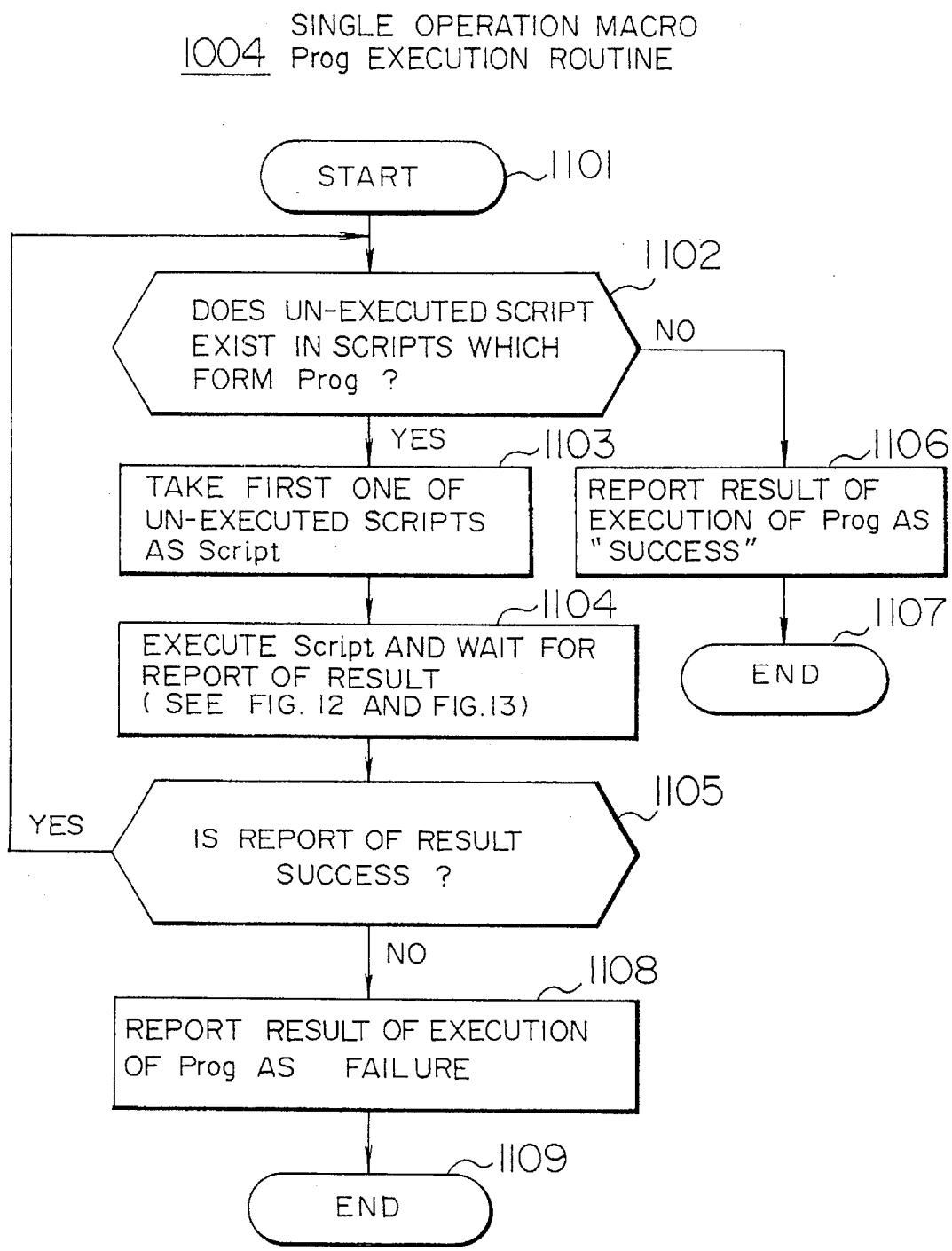
FIG. 11 is a flow chart of a single operation macro Prog execution routine in the processing shown in FIG. 10.

A processing for executing a single operation macro will now be explained using FIG. 11. In the present case, the explanation will be made taking "PrintDocument (0)" as the single operation macro Prog.

The single operation macro is a train of sequenced scripts, as apparent from the example shown in FIG. 9. First, the judgement is made of whether or not a script which has not yet been executed exists in the script train (step 1102). Upon activation, seven rows or scripts in 901 of FIG. 9 exist.

The first one of the seven rows or scripts in 901 of FIG. 9.

"SendEvent Wp Print A LeftPress"

is taken as Script (step 1103). This script is executed (step 1104). The result of execution of this script is either "success" or "failure".

If the result of script execution is "success" (step 1105), the processing for Script is completed and a processing for the next script is performed. If the result is "failure", the result of execution of the whole of Prog is reported as "failure" (step 11.08). If all of the scripts are executed without failure, the execution of Prog is reported as "success" (step 1106) after the execution of the last script is completed. In the example of "PrintDocument (0)", the case where all of the operations (1) and (2) can be executed again, corresponds to "success". The case where not so, for example, the case where the printer device is out of a paper, a failure takes place in the course and the result is reported as "failure".

Figure 12:
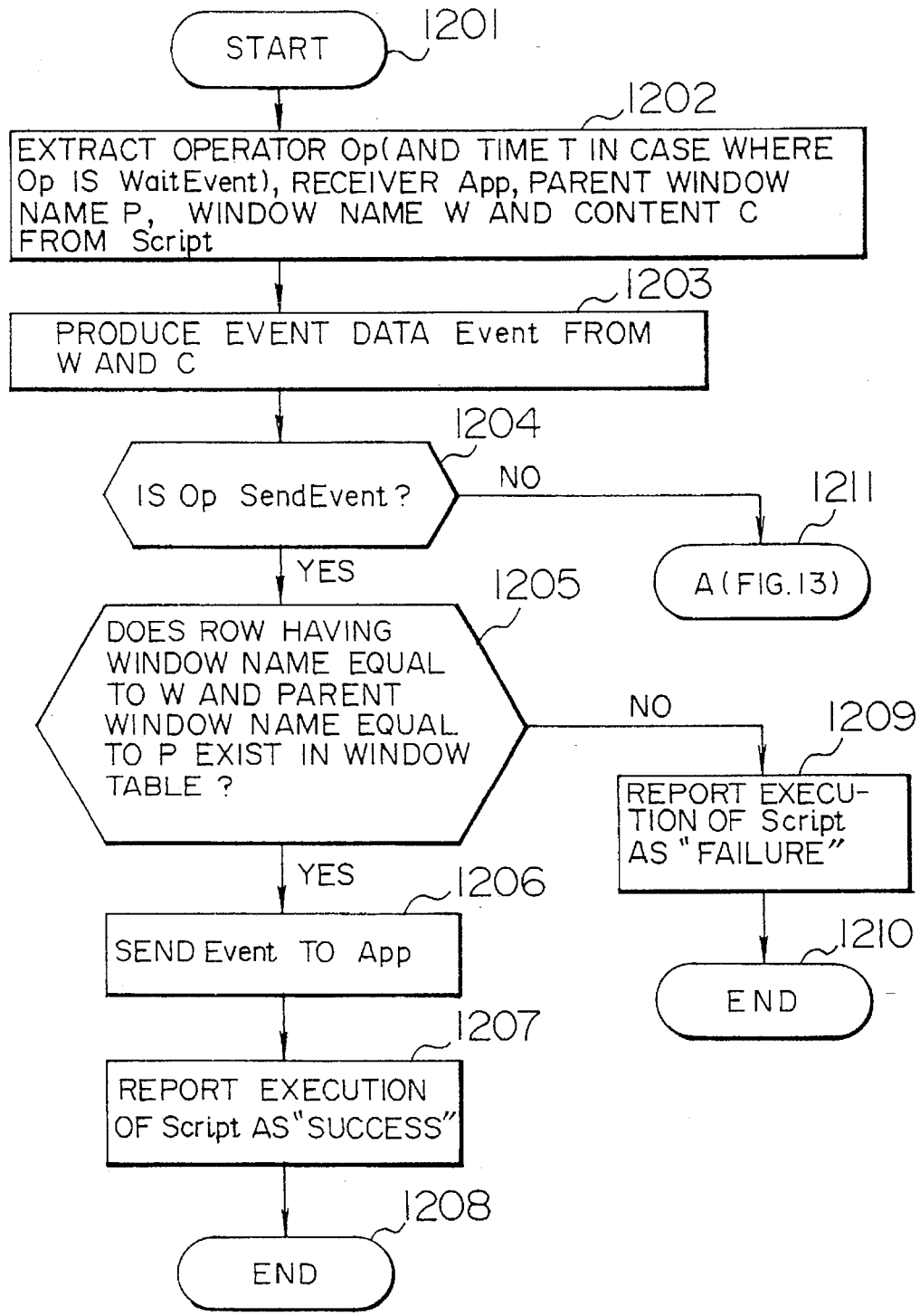
FIG. 12 is a flow chart of a part of a script (Script) execution routine in the processing shown in FIG. 11.

A processing for execution of each script will now be explained. First, the explanation will be made referring to FIG. 12 in conjunction with the case where the script "SendEvent Wp Print A LeftPress"

is taken as Script and is executed.

An operator Op, a parent window name P, a window name W, a receiver application name App and a content C are determined from Script (step 1202). In the present case, Op, P, W, App and C are "SendEvent", "Wp", "Print" "A" and "LeftPress", respectively.

And, a window event is produced from the window W, the parent window P and the content C and is taken as Event (step 1203). This window event has a conformity with a format sent from the window server 107 to each application, and the contents thereof are the same as those of a window event which is sent from the window server to the application when a user operates the mouse device 104 to press a left button of the mouse on the Print window.

Since Op is "SendEvent" (step 1204), the following steps are carried out.

First, the judgement is made of whether or not the given window exists. This judgement is made by referring to the window table 204 (step 1205). In the present case, the judgement is made by the window name and the parent window name. If the given window does not exist correctly in the window table 204, this means that the window does not exist on the display device and hence the execution of Script is reported as "failure" (step 1209).

The produced Event is sent to the application A (step 1206). The transmission is made to the port 7. This transmission brings about the same effect as an effect in the case where a user actually presses the left button of the mouse on the Print window. Though the contents of sent Event do not accurately coincide with those of an event data sent when the user actually makes the mouse operation, a processing by the application A 109 receiving the Event is the same. After transmission, the execution of the present Script is reported as "success" (step 1207), thereby completing the processing (step 1208).

Figure 13:
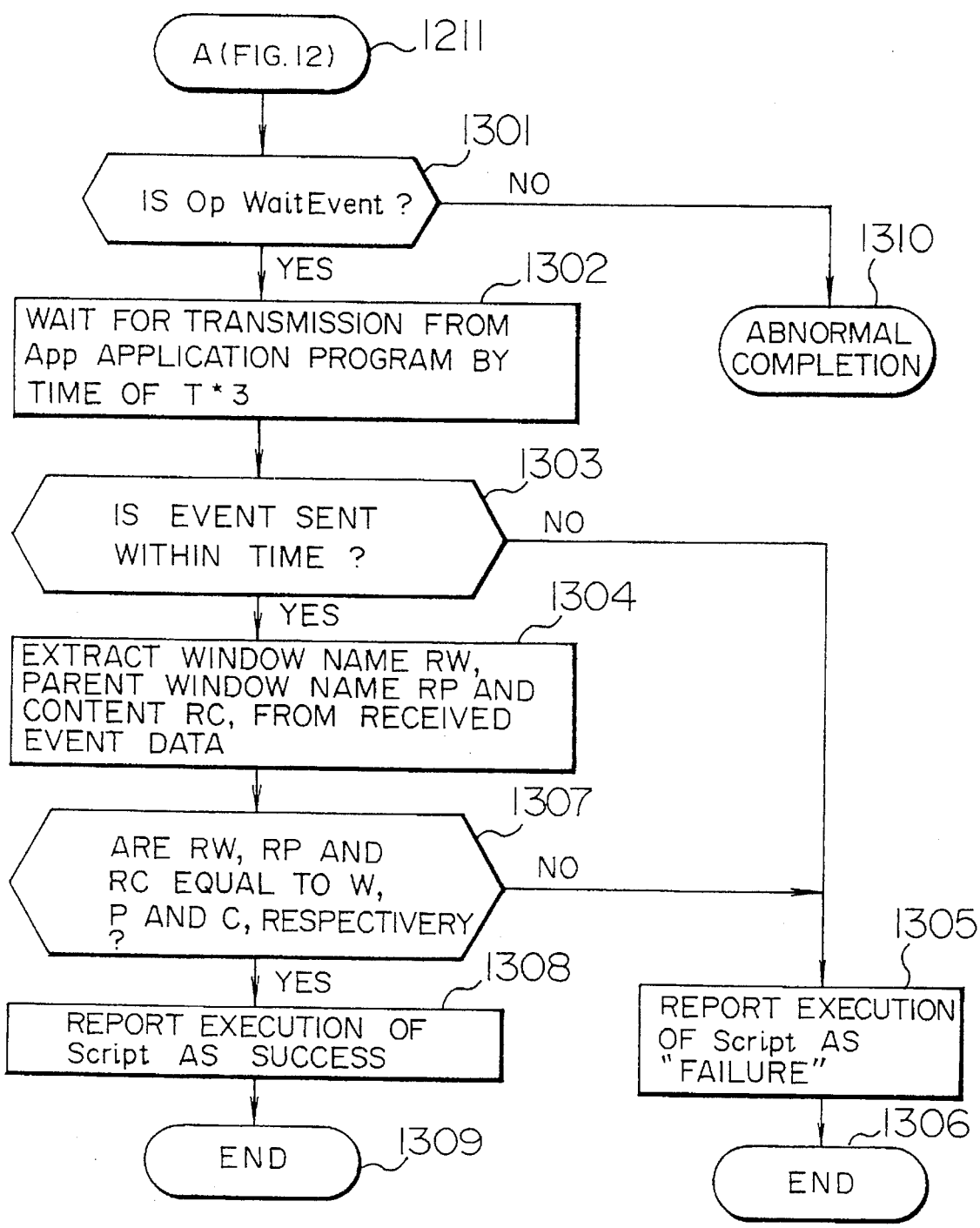
FIG. 13 is a flow chart of the other part of the script (Script) execution routine in the processing shown in FIG. 11.

Next, the explanation will be made referring to FIGS. 13 and 14 in conjunction with the case where the script "WaitEvent 80 Root Print? WM MapConfig"

is taken as Script and is executed.

In the present case, Op, T, P, W, App and C are "WaitEvent", "80", "Root", "Print?" "WM" and "MapConfig", respectively (step 1202). Also, event data Event is produced (step 1203).

Since Op is not "SendEvent" (step 1204) but "WaitEvent" (step 1301), the following steps are carried out.

A wait of 240 milliseconds is taken for one of the sent window events 212 destined for the window manager 108. Namely, the wait of 240 milliseconds is taken for the writing of the window display event data into the corresponding receiving port 4. The writing into another port (or the transmission of event data from a different application) is neglected. This wait is taken in order to send the next command after the completion of generation of a window is confirmed. A time until the generation of a window differs according to conditions on those occasions. The time of 240 milliseconds is three times as long as a time (80 milliseconds) actually required when the user operation is recorded. If the transmission is not made even with the wait of that time, the execution of Script is reported as "failure" (step 1305), thereby completing the processing (step 1306).

In the case where the window display event data is sent to the port 4, the window name RW, the parent window name RP and the event content RC are extracted from the received data (step 1304). Then, the judgement is made of whether or not RW, RP and RC are equal to W, P and C, respectively (step 1307). The equality means that the execution is correctly continued, and the difference means that a condition different from that upon macro generation is produced. If the equality is determined, the execution of Script is reported as "success" (step 1308), thereby completing the processing (step 1309). If the difference is determined, the execution of Script is reported as "failure" (step 1305), thereby completing the processing (step 1306).

There cannot exist any one of automatically generated operation macros having Op which is neither "SendEvent" nor "WaitEvent". Therefore, it is hardly possible that an abnormal completion processing (step 1310) is performed.

The execution of the operation macro "PrintDocument" shown in FIG. 9 has been mentioned in the foregoing. What is to be performed by a user with respect to the generation of the operation macro, includes indicating a series of operations for some cases and designating a portion to be subjected to operation macroprogramming on the interface screen shown in FIG. 6 to provide an instruction for generation of an operation macro. What is to be performed by the user with respect to execution, includes designating a name to issue an execution instruction.

In the example explained herein, it is assumed that only the application A is operating. However, the present embodiment is also effective for the case where another application program (for example, B) is operating and a user makes an operation over two programs. In this case, the present embodiment is realized in such a manner that events for those programs and the window manager are stored in a mixed form in the event table 205. Since which of the programs the event data is to be sent to is memorized in the event table, the generation of a macroprogram for executing those user operations and the execution of the macroprogram are possible similarly. Accordingly, it is also possible to wait for response messages from a system program for the respective programs.

As apparent from the foregoing, in the present embodiment, it is possible to generate an operation macro which dynamically waits for a response message from a system program to an application program. Further, it is possible to generate a plurality of operation macros from the examples of operations under a plurality of different conditions.

In the foregoing embodiment, the event table 205 stores therein all event data sent thereto and event data thereamong to be used for the generation of an operation macro is selected by a user. In order to reduce this load of selection imposed on the user, there can be considered a method in which the selection is entrusted to the operation macro generation routine. For example, this can be realized in such a manner that the operation macro generation routine makes the judgement of whether or not event data sent thereto is event data necessary for macroprogramming of an operation for a program A and only event data necessary for macroprogramming is stored into the event table. Otherwise, after all event data have been stored in the event table, event data necessary for macroprogramming of the operation for the program A may be selected by an operation macro generation program automatically. This purpose can be attained in such a manner that event data concerning the display or erasion of a window is always made valid.

According to the present invention, an operation macro can easily be generated from an example of an operation for an application program in such a manner that the operation macro includes a command for dynamically waiting for a response message from a system program which controls the execution of the application program.

Also, an operation macro can be generated which is usable even for the case where a response message from an application program changes for the same input or the case where a plurality of operation macros are to be generated from a plurality of operation examples.

We claim:

1. A method of generating a program for executing a series of user operations performed for one selected application program of a plurality of application programs in a computer system which executes said plurality of application programs in parallel under the control of a window program, said window program allotting a window to each of said application programs, executing a request for the generation or erasion of a new window issued from each of said application program of a user and informing each application program of a user operation for each application program, the method comprising:

(a) a step of giving, each time a window program generates or erases a window requested from said selected application program, information of the generation or erasion of the window from said window program to a specified program which is provided commonly to said plurality of application programs;

(b) a step of giving, each time a user operation is performed for one or a plurality of windows used by said selected application program, information of a performance of the user operation for the window from said window program to said specified program;

(c) a step of storing a first kind of signal when the information by said step (a) is given, said first kind of signal indicating a window and the generation or erasion thereof which are designated by the information and storing a second kind of signal by said specified program when the information by said step (b) is given, said second kind of signal indicating a window and a user operation which are designated by the information;

(d) a step of generating, by said specified program on the basis of a plurality of said first kinds of signals and a plurality of said second kinds of signals stored by said step (c), a program for executing a series of user operations for one selected application program and wherein the program for executing includes a plurality of commands to be supplied to the said window program, wherein said step (d) includes (d1) generating a first command on the basis of each stored first kind of signal, said first command being a command for waiting for information of the generation or erasion of a window indicated by that first kind of signal, said first command being a command for waiting for information of the generation or erasion of a window indicated by that first kind of signal to be given from said window program to said specified program and for designating a wait time for the waiting taken by said first command, thereby delaying the execution of the subsequent command until said information is given, and (d2) generating a second command on the basis of each stored second kind of signal, said second command being a command for informing said window program that a user operation indicated by said second kind of signal is performed for a window indicated by said second kind of signal; and, (e) a step of determining the wait time by said specified program on a basis of a time interval at which a plurality of information were generated.

2. The method according to claim 1, wherein the determining step includes a step of determining the wait time by a time interval between the information which provided an opportunity for the storage of the first kind of signal stored and an other information which was issued from said window program prior to said information.

3. A method according to claim 1, further comprising:

a step of further inputting another series of user operations to be inputted in the case where there does not take place the window generation or erasion for which one of said plurality of commands waits;

a step of executing said steps (a) to (d) while said other series of user operations are performed, and generating as the result of execution an other program for performing said other series of user operations; and a step of storing the other generated program as a program to be executed in place of a command subsequent to said one command in the case where during execution of said program generated for said series of user operations the waiting of said one command does not result in a success within a predetermined wait time.

4. A method according to claim 1, wherein said step of generating the other program includes storing said other program with the same title as said program generated for said series of user operations.

5. A method of generating a program which performs a processing designated by a series of user operations performed for an application program, the method comprising:

(a) a step of storing the series of user operations for said application program and response messages issued for at least one of said series of user operations from a program which performs a processing related to said application program or said one user operation, said series of user operations and said response messages being stored in an order of input of respective user operations and instants of generation of the response messages;

(b) a step of generating, on the basis of said series of user operations and said response messages stored, a program composed of a series of commands for inputting said series of user operations to said application program, wherein said step (b) includes (b1) generating on the basis of each stored user operation a command which causes said application program to perform the user operation and (b2) generating on the basis of said response message a specified command for waiting for that response message to be issued from the program which performs a processing related to said application program or said one user operation;

(c) a step of executing said steps (a) and (b) for another series of user operations performed as operations to be inputted in a case where said response message is not issued from the program which performs the processing related to said application program or said one user operation, and generating a result of execution of an other program for inputting said other user operations to said application program; and (d) a step of storing the other generated program as a program to be executed in place of a command subsequent to said one command in the case where during execution of said program generated for said series of user operations a wait of said specified command does not result in success within a predetermined time.

6. A method according to claim 5, wherein said step of generating the other program includes storing said other program with the same title as said program generated for said series of user operations.

* * * * *

UNITED STATES PATENT AND TRADEMARK OFFICE
CERTIFICATE OF CORRECTION

PATENT NO. : 5,566,336
DATED : October 15, 1996
INVENTOR(S) : Seiji Futatsugi, et al.

It is certified that error appears in the above-indentified patent and that said Letters Patent is hereby corrected as shown below:

IN THE TITLE: Item [54] and Col.1, line 1, delete "GENERATED" and insert therefor --GENERATION--.

IN THE CLAIMS:

Claim 4, column 16, line 54, delete "claim 1" and insert therefor --claim 3--.

Signed and Sealed this

Seventh Day of January, 1997

Attest:

BRUCE LEHMAN

Attesting Officer

Commissioner of Patents and Trademarks